United States Patent
Hippenmeyer et al.

[11] Patent Number: 5,874,719
[45] Date of Patent: Feb. 23, 1999

[54] METHOD AND APPARATUS FOR DISTANCE MEASUREMENT

[75] Inventors: Heinrich Hippenmeyer, Freiamt; Hans-Werner Pierenkemper, Emmendingen, both of Germany

[73] Assignee: Erwin Sick GmbH Optik_Elektronik, Waldkirch/Breisgay, Germany

[21] Appl. No.: 659,699

[22] Filed: Jun. 5, 1996

[30] Foreign Application Priority Data

Jun. 8, 1995 [DE] Germany ............... 195 20 993.1

[51] Int. Cl.$^6$ ............... G06K 7/10; G01N 21/86
[52] U.S. Cl. ............... 235/462; 235/472; 235/454; 250/561
[58] Field of Search ............... 235/462, 472, 235/454; 250/501

[56] References Cited

U.S. PATENT DOCUMENTS

| | | | |
|---|---|---|---|
| 3,428,815 | 2/1969 | Thompson | 250/217 |
| 3,860,792 | 1/1975 | Myren | 235/463 |
| 4,214,154 | 7/1980 | Sato | 250/201 |
| 4,710,709 | 12/1987 | Anderson, III et al. | 324/207 |
| 5,180,922 | 1/1993 | Hug | 250/561 |
| 5,308,966 | 5/1994 | Danielson et al. | 235/472 |
| 5,309,212 | 5/1994 | Clark | 356/6 |
| 5,426,288 | 6/1995 | Obata et al. | 235/462 |
| 5,479,011 | 12/1995 | Rudeen et al. | 235/472 |
| 5,532,480 | 7/1996 | Scofield | 250/235 |
| 5,587,787 | 12/1996 | Jager | 356/141.1 |
| 5,638,164 | 6/1997 | Landau | 356/5.01 |
| 5,648,844 | 7/1997 | Clark | 356/5.09 |

FOREIGN PATENT DOCUMENTS 0 610 918 A2  8/1994  European Pat. Off. .
40 40 084 A1  6/1992  Germany .

*Primary Examiner*—Anita Pellman Gross
*Assistant Examiner*—Douglas X. Rodriguez
*Attorney, Agent, or Firm*—Townsend and Townsend and Crew

[57] ABSTRACT

The invention relates to a method and to an apparatus for measuring the distance between a measuring device and an object in which a light signal transmitted over the measurement path undergoes a phase shift which is converted into a frequency change in an oscillating circuit.

16 Claims, 1 Drawing Sheet

METHOD AND APPARATUS FOR DISTANCE MEASUREMENT

The invention relates to a method for detecting the distance between a measurement device, having a transmitter and a receiver, and an object, wherein a modulated signal, in particular a light signal, is transmitted by the transmitter, this signal is reflected by the object and the reflected signal is received by the receiver and evaluated in the measurement device, with the received signal undergoing a phase displacement relative to the transmitted signal dependent on the signal transit time over the measurement path.

Furthermore, the invention relates to an apparatus for carrying out such a method and also to a preferred use thereof.

BACKGROUND OF THE INVENTION

In known methods and apparatus for distance measurement, the said phase change between the transmitted and received signal is exploited to calculate the distance to be detected. For this purpose, the absolute value of the phase shift which has occurred must be determined and this is generally only possible with a comparatively high degree of complexity and cost, and is thus deleterious to the economy of the known methods and apparatus.

SUMMARY OF THE INVENTION

An object of the invention consists in so designing a method of the initially described kind that it can be carried out with the lowest possible complexity.

In accordance with the invention, this object is satisfied in that at least the transmitter, the measurement path, the receiver and a filter component having a phase shift form an oscillating circuit, the oscillation frequency of which depends on the signal transit time over the measurement path and is impressed on the transmitted, modulated signal, with the distance to be detected being found from the frequency or from the duration of a cycle of the oscillating circuit.

In the realisation of the method of the invention an oscillating circuit is accordingly provided, the resonant frequency of which is impressed on the transmitter of the measurement device, whereby ultimately a transmission of a modulated signal is initiated, in particular of a modulated light signal, the frequency of modulation of which is identical to the resonant frequency of the oscillating circuit. The received signal which has a phase shift, as a result of the signal transit time or light transit time over the measurement path when compared with the transmitted signal, is used in accordance with the invention to act on the filter component, In this way, a situation is achieved in which the resonant frequency of the oscillating circuit changes in dependency on the phase shift that occurs. In this respect, the resonant frequency of the oscillating circuit represents a measure for the distance to be determined.

BRIEF DESCRIPTION OF THE DRAWINGS

In accordance with the invention, the transmitter, the measurement path, the receiver and the filter component thus form a closed system with feedback, the oscillating frequency of which changes in dependence on the length of the measurement path or on the distance to be determined.

DESCRIPTION OF THE PREFERRED EMBODIMENTS

Figure 1:
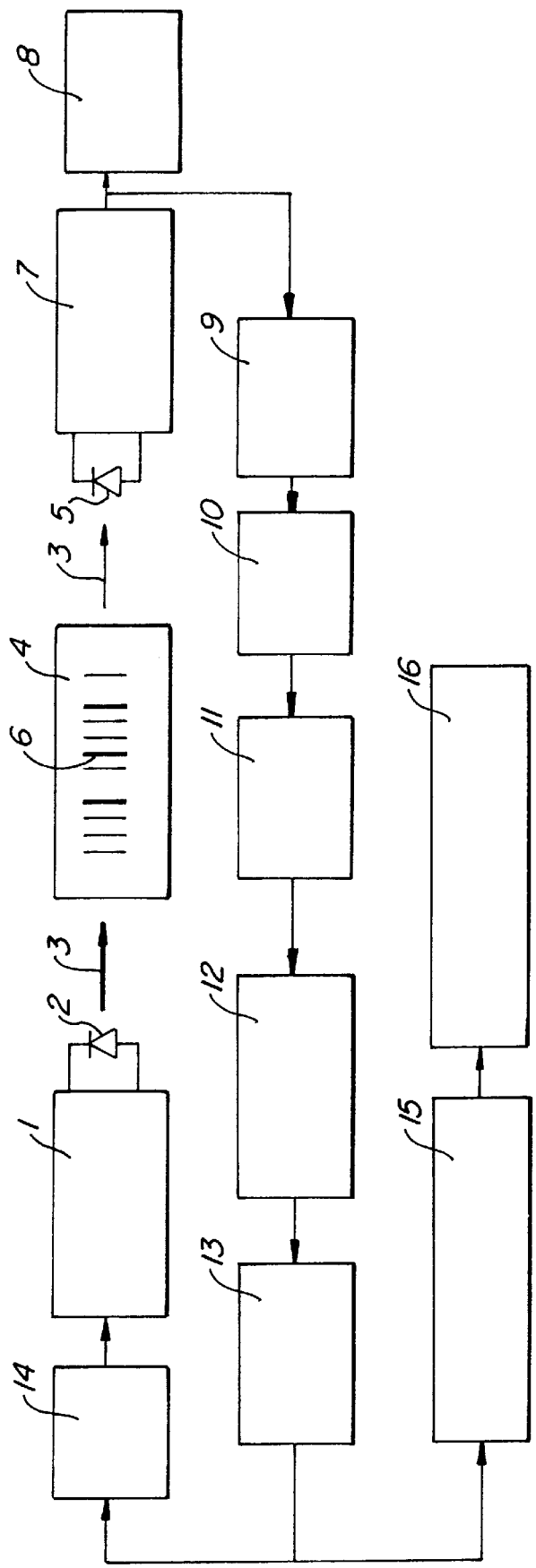

Accordingly, it is possible in accordance with the invention to ultimately determine the distance to be found with a very low cost and expenditure through a simple frequency or cycle duration measurement which is possible with a significantly smaller cost and complexity in comparison to the previously used phase measurement. Through the invention a method is thus made available with which distance measurements can be carried out with considerably lesser cost and complexity than is required in the prior art.

Preferably, the filter component is to be executed in such a way that a linear measurement range or a linear phase characteristic is present at least for the signal transit time or light transit time relevant to the system. In this case, a direct proportionality exists between the resonant frequency of the oscillating circuit and the distance or length of the measurement path which is to be found.

It is, however, also possible to determine the function of the oscillating frequency in relation to the object spacing via a reference measurement, to store this function and to ultimately calculate the distance spacing from the oscillating frequency by means of this function.

The filter component preferably has a particularly steep phase characteristic since, with increasing steepness of the phase characteristic, the resolution aimed at in the distance measurement is also increased. In this connection it is sensible to design the filter component, for example as a filter of the fourth to eighth order.

In a further preferred embodiment of the method of the invention the frequency of the oscillating circuit is stepped down by mixing prior to determining the frequency or the duration of a cycle of the oscillating circuit. In this manner, an additional simplification results for the measurement which is to be carried out because the stepped-down frequency can be determined with simpler means than the actual frequency of the oscillating circuit. The stepped-down mixing of the resonant frequency must in this case be realised by components which are arranged outside of the closed system, consisting of the transmitter, the measurement path, the receiver and the filter component, so that the procedure of step-down mixing has no effects on the signals which exist in the closed circuit.

Prior to carrying out a measurement process for distance determination, a reference measurement can regularly be carried out in which the total system is, for example, calibrated to a distance corresponding to half the measurement range. In this way, undesired temperature and aging effects which falsify the measurement results can be precluded.

The method of the invention can be used in a particularly advantageous manner in a code reader with an integrated auto-focus function, since in this case the signal reflected from the object carrying the code and received by the receiver can act both on the filter component and also be used for code recognition. In this case, only a few additional components, and essentially only the filter component and a component group for frequency determination, need be additionally provided in a customary code reader. This is because the transmitter and the receiver of a code reader can satisfy the described double-function when used for the method of the invention, in accordance with which the signal transmitted and received by them, serves both to act on the filter component and also for code recognition.

When using the method of the invention in a code reader, the received light signal must be separated into two components of which one is used to determine the code and the other to determine the distance. These two signal components are located in different band regions, so that the said splitting-up can be effected straightforwardly by means of a suitable filter.

Further preferred embodiments of the method of the invention, and also an apparatus for carrying out the method of the invention, are set forth in the subordinate claims.

The invention will now be described by way of example with reference to preferred embodiment and to the single figure which shows a block circuit diagram of an apparatus for carrying out the method of the invention which is integrated into a code reader with an auto-focus function.

The circuit shown in the figure has a transmitter acted on by a control circuit 1, in particular a laser diode 2, which transmits a modulated light beam over a measurement path 3. The light beam is reflected by an object 4 arranged at the end of the measurement path 3 and passes in this manner via the measurement path 3 to a receiver, in particular to a light receiver 5.

The object 4 is provided with a code which is scanned by the light beam transmitted from the laser diode 2.

The signal generated by the light receiver 5 is supplied to a receiving circuit 7, the output signal of which is applied, on the one hand, to a circuit 8 for determining the code 6 to be sensed and, on the other hand, to a circuit consisting of a plurality of component groups for detecting the distance between the laser diode 2 or the light receiver 5 and the object 4.

The signal transmitted by the receiver circuit 7 can, for example, be split-up into two different signals through the provision of corresponding band pass filters of which one signal serves for code determination and the other for distance determination. The frequencies of the signal component suitable for the code determination lie as a rule in a lower band range, whereas the signal component suitable for distance measurement can, for example, lie in a higher frequency range. Through the provision of corresponding filters, these two signal components can be extracted in a simple manner from the output signal from the receiver circuit 7.

A filter or band pass 9 for the extraction of the signal suitable for the distance determination is acted on in the embodiment shown in the drawing by the output signal of the receiver circuit 7.

The signal delivered by the band pass filter 9 is supplied to a phase correction circuit 10 which is so laid out that it compensates the band restricting or phase shifting influence of the individual components of the total circuit so that finally the signal present at the output of the phase correction circuit 10 ultimately essentially only has the phase shift which is brought about by the light transit time over the measurement path 3 and is characteristic for the distance to be determined.

In addition, a calibration of the distance measuring apparatus, in particular to a distance corresponding to half the measurement range, can be carried out via the phase correction circuit 10 in the manufacturing process by a simple adjustment of this circuit.

The output of the phase correction circuit 10 is connected to an amplifier 11, the output signal of which acts on a filter component 12 having a phase shift characteristic or frequency characteristic.

The output signal of the filter component 12 is supplied to a non-linear amplifier 13, in particular to an amplifier having a logarithmic characteristic which serves to make available an output signal of defined amplitude which can ultimately be applied to the control circuit 1 for the control of the laser diode 2. In this manner it is ensured that the amplitude of the signal which controls the laser diode 2 is independent of the amplitude of the signal delivered by the light receiver 5.

Having regard to the two amplifiers 11 and 13, it should be mentioned that these can also be arranged at other positions in the closed circuit and, in particular, the two amplifier functions of the amplifiers 11 and 13 can be combined into a single amplifier element.

A correction network 14 is preferably connected between the non-linear amplifier 13 and the control circuit 1 which impresses a sinusoidal waveform on the signal delivered by the non-linear amplifier 13, whereby an accurate phase control of the control circuit 1 is ensured.

The described components laser diode 2, measurement path 3, light receiver 5, receiver circuit 7, band pass filter 9, phase correction circuit 10, amplifier 11, filter component 12, non-linear amplifier 13, correction network 14 and control circuit 1 form a closed, feedback-coupled system or an oscillating circuit in which different light transit times over the measurement path 3 lead to a phase change of the signal delivered by the light receiver 5 which is converted in the oscillating circuit into a frequency change.

This frequency change can be determined with little cost and complexity with regard to electronic components by a suitable evaluation circuit 15 to the input of which the output signal of the non-linear amplifier 13 is applied. The evaluation circuit 15 which is not a component of the said closed system can serve either for the frequency determination or for the determination of the period of the applied input signal.

As the filter component 12—as already mentioned—is preferably operated in the linear region of its phase characteristic, a direct and proportional conversion of a phase shift into a frequency change takes place. Since the phase shift represents a measure for the distance to be determined or for the light transit time over the measurement path, the distance to be determined can be derived in a simple manner from the frequency or the duration of a cycle of the oscillating circuit.

A circuit for step-down mixing of the frequency of the output signal of the non-linear amplifier 13 can be additionally provided between the non-linear amplifier 13 and the evaluation circuit 15 outside of the closed system. In this case, the frequency to be found can be determined with even less cost and complexity.

The frequency determined by the evaluation circuit 15 or the duration of a cycle is supplied to a subsequent calculating circuit 16 which calculates the distance to be found between the laser diode 2, or the light receiver 5, and the object 4 from the frequency or from the duration of a cycle.

It is an advantage of the code reader shown in the drawing that the control circuit 1, laser diode 2, light receiver 5 and receiver circuit 7 serve both to generate the signal required for the code determination and also to generate a signal necessary for the distance determination without these components having to be present twice in the code reader as in the prior art.

The aforementioned reference measurement at a distance corresponding to half the measurement range, which is preferably carried out before each measurement process, can for example be carried out with a code reader in such a way that the transmitted light beam senses, by means of a rotatable mirror wheel, a reference mark within the V-shaped reading field which arises. This reference mark which is internally provided in the code reader defines a reference distance and consequently delivers a basis for the calculation of the external object spacing. In this manner, temperature and aging effects can be precluded.

What is claimed is:

1. A method of detecting distance between a measurement device having a transmitter emitting a transmitted signal and a receiver for receiving a reflected signal, and an object for reflecting the transmitted signal from the transmitter as the reflected signal to the receiver over a measurement path with the reflected signal undergoing a phase displacement relative to the transmitted signal dependent upon transit time over the measurement path, the method comprising the steps of:

providing a transmitter;

providing a receiver;

providing an oscillating circuit to produce variable oscillating frequency to the transmitter;

emitting from the transmitter a modulated oscillating signal as a function of the variable oscillating frequency;

receiving at the receiver the reflected signal;

detecting phase displacement of the reflected signal relative to the transmitted signal dependent upon the transit time over the measurement path with a filter component having a phase shift as an output; and, varying the variable oscillating frequency of the oscillating circuit responsive to detected phase displacement in dependence upon transit time over the measurement path by utilizing the output of the filter component to vary the variable oscillating frequency; and, measuring the measurement path as a function of the variable oscillating frequency.

2. The method of detecting distance according to claim 1 and wherein the step of varying the variable oscillating frequency of the oscillating circuit includes:

providing non-linear amplification to the detected phase displacement.

3. The method of detecting distance according to claim 1 and wherein the variable oscillating frequency of the provided oscillating circuit has a sinusoidal shape.

4. The method of detecting distance according to claim 1 and wherein the step of detecting phase displacement includes:

providing a filter component having an input and an output;

utilizing phase shift as an input to the filter component; and, utilizing the output of the filter component to vary the variable oscillating frequency.

5. The method of detecting distance according to claim 1 and wherein the provided oscillating circuit has an initial oscillating frequency for oscillating to a frequency corresponding to about half of the measurement path.

6. The method of detecting distance according to claim 1 and including the additional steps of:

providing a code reflector attached to the object to generate a reflected code signal;

providing a filter for discriminating the reflected code signal from the reflected signal; and, detecting phase displacement of the reflected signal relative to the transmitted signal upon receiving the reflected code signal from the filter.

7. Apparatus for detecting distance between a measurement device having a transmitter emitting a transmitted signal and a receiver for receiving a reflected signal, and an object for reflecting the transmitted signal from the transmitter as the reflected signal to the receiver over a measurement path with the reflected signal undergoing a phase displacement relative to the transmitted signal dependent upon transit time over the measurement path, the apparatus comprising;

a transmitter for emitting a transmitted signal;

an oscillating circuit connected to the transmitter to produce an oscillating frequency to the transmitted signal, the oscillating circuit having an input for varying the oscillating frequency;

a receiver for receiving the reflected signal;

means for detecting phase displacement relative to the transmitted signal dependent upon the transit time over the measurement path, the means for detecting phase displacement having a filter with a phase shift as an output connected to the receiver; and, the output of the filter component connected to the input of the oscillating circuit to vary the oscillating frequency of the oscillating circuit responsive to detected phase displacement in dependence upon transit time of the transmitted signal over the measurement path; and, means for measuring the measurement path as a function of the oscillating frequency.

8. The apparatus for detecting distance according to claim 7 and further including:

the means for detecting phase displacement relative to the transmitted signal includes a filter having a linear phase.

9. The apparatus for detecting distance according to claim 7 and further including:

the means for detecting phase displacement relative to the transmitted signal includes a filter having a steeply extending phase characteristic.

10. The apparatus for detecting distance according to claim 7 and further including:

the means for detecting phase displacement relative to the transmitted signal includes a filter having a component of the fourth to eighth order.

11. The apparatus for detecting distance according to claim 7 and further including:

a non-linear amplifier is placed between the receiver for receiving the reflected signal and the means for detecting phase displacement relative to the transmitted signal.

12. The apparatus for detecting distance according to claim 7 and further including:

the output of the means for detecting phase displacement connects to a non-linear amplifier.

13. The apparatus for detecting distance according to claim 7 and further including:

means for providing a sine wave connects to the transmitter.

14. The apparatus for detecting distance according to claim 7 and further including:

a phase correction filter is connected between the receiver and the means for detecting phase displacement.

15. The apparatus for detecting distance according to claim 7 and further including:

the means for measuring the measurement path as a function of the oscillating frequency includes a frequency mixing stage for the step down mixing of the frequency of the oscillating circuit.

16. The apparatus for detecting distance according to claim 7 and further including:

a code reflector attached to the object to generate a reflected code signal;

a filter for discriminating the reflected code signal from the reflected signal connected to the receiver; and, means for detecting phase displacement of the reflected signal relative to the transmitted signal upon receiving the reflected code signal from the filter.

* * * * *